United States Patent [19]

Kangas

[11] Patent Number: 5,504,937
[45] Date of Patent: Apr. 2, 1996

[54] LOCAL TRAFFIC CAPACITY CONTROL IN A CELLULAR RADIO NETWORK

[75] Inventor: Sakari Kangas, Vantaa, Finland

[73] Assignee: Nokia Telecommunications Oy, Espoo, Finland

[21] Appl. No.: 117,057

[22] PCT Filed: Mar. 4, 1992

[86] PCT No.: PCT/FI92/00063

§ 371 Date: Oct. 14, 1993

§ 102(e) Date: Oct. 14, 1993

[87] PCT Pub. No.: WO92/16061

PCT Pub. Date: Sep. 17, 1992

[30] Foreign Application Priority Data

Sep. 5, 1991 [FI] Finland .................................. 911092

[51] Int. Cl.⁶ .......................................... H04Q 7/30
[52] U.S. Cl. ...................... 455/33.3; 455/33.4; 455/56.1
[58] Field of Search ............................ 455/33.1, 33.3, 455/37.4, 54.1, 56.1, 123, 33.4; 370/95.3

[56] References Cited

U.S. PATENT DOCUMENTS

| | | | |
|---|---|---|---|
| 4,144,496 | 3/1979 | Cunningham et al. | 455/33.3 |
| 4,435,840 | 3/1984 | Kojima et al. | 455/33 |
| 4,759,051 | 7/1988 | Han | 455/33.3 |
| 5,048,116 | 9/1991 | Schaeffer | 455/33.3 |
| 5,119,501 | 6/1992 | Perry et al. | 455/33.3 |
| 5,276,907 | 1/1994 | Meidan | 455/33.3 |
| 5,303,240 | 4/1994 | Borras et al. | 455/33.3 |

FOREIGN PATENT DOCUMENTS

| | | |
|---|---|---|
| 0399206 | 11/1990 | European Pat. Off. . |
| 0416872 | 3/1991 | European Pat. Off. . |
| 1562963 | 3/1980 | United Kingdom . |

*Primary Examiner*—Edward F. Urban
*Attorney, Agent, or Firm*—Cushman Darby & Cushman

[57] ABSTRACT

A method for controlling local traffic capacity in a cellular radio network having several base stations each having one or more assigned frequency channels for establishing radio connections with active mobile radios presently located within a predetermined radio coverage area thereof. The assigned frequency channels are different at least in base stations having adjoining radio coverage areas. At least one of the base stations directs at least one of its assigned frequency channels to another radio coverage area deviating from the predetermined coverage area and covering at least partly the radio coverage area of one of the neighboring base stations when the traffic capacity requirement within the radio coverage area of the neighboring base station increases substantially.

7 Claims, 1 Drawing Sheet

LOCAL TRAFFIC CAPACITY CONTROL IN A CELLULAR RADIO NETWORK

FIELD OF THE INVENTION

The invention relates generally to a method for controlling of local traffic capacity in a cellular radio network.

BACKGROUND OF THE INVENTION

In cellular mobile radio networks, the geographical area covered by the network is divided into smaller radio coverage areas, i.e. radio cells, each comprising at least one base station. In each cell, a certain number of frequency channels are assigned to the base station, and the frequency channels, in turn, may be time-division multiplexed into several traffic channels on the TDMA principle. Typically, the size and density of the radio cells as well as the number of frequency channels assigned to them are determined by the traffic capacity requirements in each particular area. The cellular mobile radio network may, however, comprise radio cells or larger areas in which the traffic capacity requirements may increase temporarily to a very high degree, e.g. at certain hours of the day. If the number of channels assigned to the radio cell is now determined on the basis of this instantaneous maximum capacity, the number of channels will be high, resulting in a higher number of radio equipments at the base station and therefore higher costs. Such an arrangement does not either enable efficient utilization of radio frequencies in the network. On the other hand, if the number of channels and the base station equipment are not dimensioned on the basis of the peak traffic in a service area, the number of rejected calls will be very high within that service area at peak hours.

In certain prior art networks, attempts have been made to alleviate the capacity problem by increasing transmitting powers in the network. In GB Patent Specification 1562963, the mobile radios are able to increase the coverage area (transmitting power) of their transmissions when adjacent base stations are overloaded in order to establish a connection to less loaded, more remote base stations. U.S. Patent Specification 4435840, in turn, teaches a cellular system in which the cell size of an overloaded base station is temporarily decreased by reducing its transmitting power while correspondingly increasing the transmitting power and the cell size of a neighbouring base station. Changes in transmitting powers may, however, cause interference elsewhere in the network and complicate the design of the network.

SUMMARY OF THE INVENTION

The object of the present invention is to provide an arrangement of a new type for alleviating the capacity problem.

To this end, a base station according to the invention for a digital cellular radio system comprises at least one radio transmitter and radio receiver, an antenna means having a predetermined radio coverage area, and at least one frequency channel assigned to the base station, the frequency channel being divided into several traffic channel time slots on the TDMA principle. In the base station according to the invention, at least one radio transmitter is permanently connected or temporarily connectable to an additional antenna means in addition to the antenna means so that the joined radio coverage area of the two antenna means is variable, in order to control the local traffic capacity of the cellular radio network, between a first radio coverage area substantially corresponding to the predetermined radio coverage area and a second radio coverage area deviating substantially from the predetermined radio coverage area by adjusting the mutual phase difference and/or transmitting power ratio of the two antenna means. In this embodiment, the base station may divide the capacity of the same frequency channel between its own cell and an adjacent radio cell and adjust the division of the capacity into these cells.

The invention further relates to a cellular radio network, comprising several base stations each having one or more assigned frequency channels for establishing radio connections with active mobile radio stations presently located within a predetermined radio coverage area thereof, the assigned frequency channels being different at least in base stations having adjoining radio coverage areas, each base station comprising at least one radio transmitter and radio receiver and an antenna means having the predetermined radio coverage area. In the network according to the invention, at least one base station is provided with means for switching at least one radio transmitter between an additional antenna means and the antenna means in response to the traffic load of one of the adjacent base stations, the additional antenna means having a radio coverage area deviating from the predetermined radio coverage area and covering at least partially the radio coverage area of the one of the adjacent base stations.

The base stations are capable of directing part or all of their capacity (frequency and/or traffic channels) temporarily to the service area of an adjacent radio cell in which the traffic capacity requirement has increased temporarily. When using the invention, the number of channels of an individual radio cell need not be dimensioned by the instantaneous maximum capacity requirements of the particular cell but the dimensioning can be based on the average value of the maximum capacity requirements of several adjoining radio cells. Thus the traffic capacity of an individual cell can be increased, if required, by directing part of the capacity of the neighbouring cells to this cell, thus effectively controlling the local network capacity and improving the utilization efficiency of the equipments and frequency/traffic channels of the base stations. The invention also improves the utilization of radio channels in the entire network.

BRIEF DESCRIPTION OF THE DRAWINGS

In the following, the invention will be described in greater detail by means of embodiments with reference to the attached drawings, in which.

THE PREFERRED EMBODIMENTS OF THE INVENTION

The method according to the invention can be applied both in digital mobile radio systems, such as the Pan-European mobile radio system GSM (Groupe Speciale Mobile), and in analog mobile radio systems, such as the Nordic mobile telephone system NMT, for controlling the local traffic capacity in the mobile radio network. Insofar as practicing the invention is concerned, the analog and the digital systems are similar, even though one frequency channel forms a single traffic channel in a typical analog mobile radio system whereas the traffic capacity of a typical digital mobile radio system is greater, because several, typically 8, traffic channels are time-division multiplexed for each frequency channel on the TDMA principle. That is, the same frequency channel may have as many as 8 simultaneous connections between the base station and the mobile radios. The basic configuration and basic functions of the GSM and NMT systems are well-known to one skilled in the art and relatively accurately defined in the specifications of the two systems. Certain basic concepts and elements of the mobile radio system (primarily GSM) will be defined below with reference to FIG. 1 in so far as they are relevant to the description of the invention. An area within which mobile radio services are available is called a mobile radio network which may cover several countries.

The mobile radio network may comprise one or more service areas, that is, an area within which a single mobile services switching center MSC offers services. The service area may be divided into one or more location areas, that is, an area covered by several radio cells. A cell is the smallest geographical area of the system, comprising one or more fixed radio stations or base stations BTS and using predetermined frequency channels.

Figure 1:
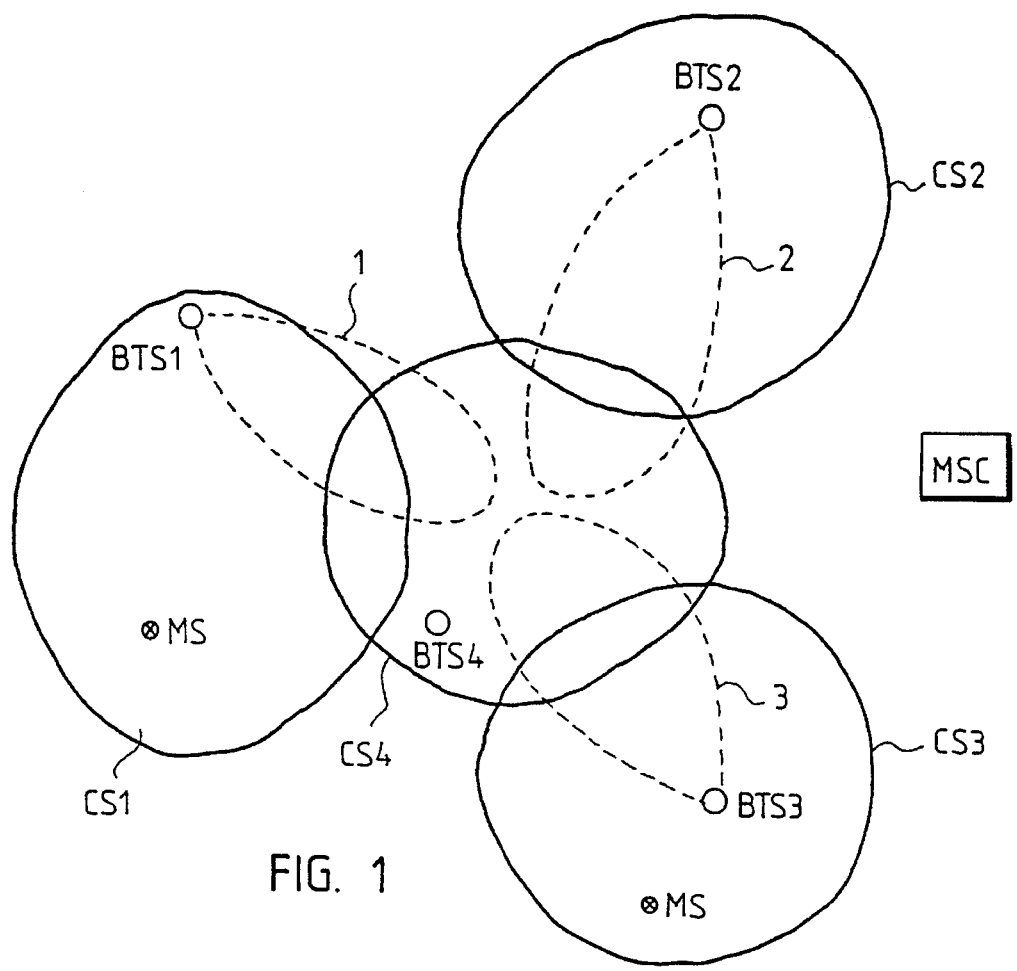
FIG. 1 is a diagrammatic presentation of a portion of a cellular mobile radio network in which the method according to the present invention can be applied.

FIG. 1 shows by way of example one service or location area of a cellular mobile radio network, within which the present invention can be applied. The geographical area covered by the cellular mobile radio network is divided into smaller radio areas or radio cells CS1, CS2, CS3 and CS4 substantially continuously so that adjacent radio areas adjoin or overlap. Each radio cell CS1–CS4 comprises at least one fixed radio station or base station BTS1–BTS4, respectively, which is capable of establishing a connection with mobile radios MS presently located or moving in the respective radio cell CS1–CS2 on the assigned frequency channels, that is, at transmitting and receiving frequency pairs (duplex spacing e.g. 45 MHz). Typically, at least neighbouring radio cells have mutually different assigned frequency channels. Each base station BTS further has signalling and traffic channel links with the mobile services switching center MSC, which controls the operation of one or more base stations located in its service area. In the case shown in FIG. 1, it is assumed for the sake of simplicity that all base stations BTS1–BTS4 are connected to the same mobile services switching center MSC.

Figure 2:
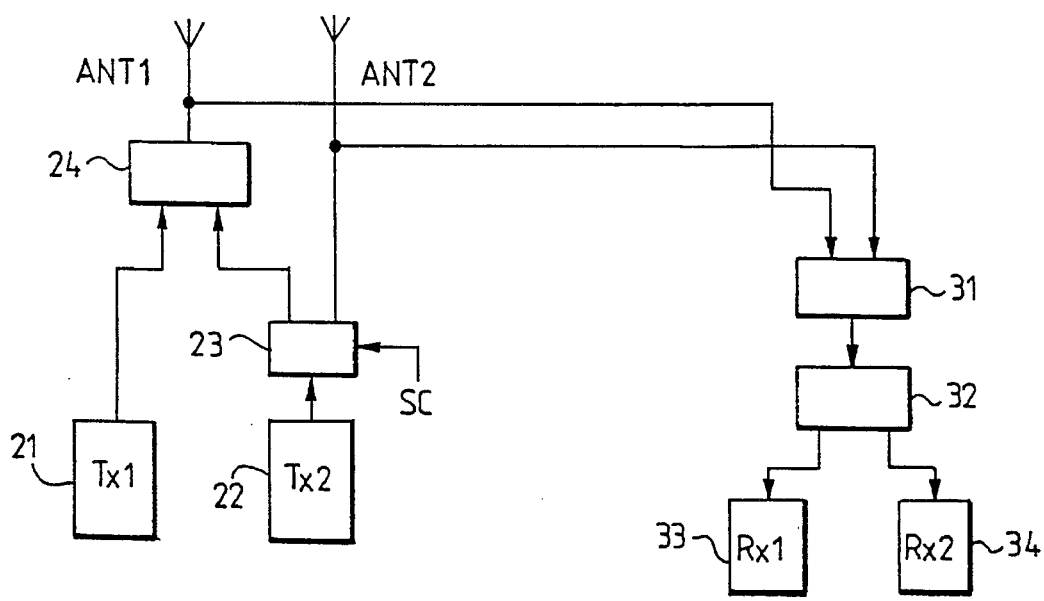
FIG. 2 is a block diagram of a transmitter section and of the receiver section of a base station according to the invention.

FIG. 2 illustrates the configuration of a base station according to the invention. Each base station BTS1–BTS4 within the cellular mobile radio network typically comprises at least one radio transmitter and radio receiver, in the illustrated case two radio transmitters 21 and 22 and two radio receivers 33 and 34, which are all connected to a main antenna unit ANT1. The size and shape of the radio coverage area of the main antenna unit ANT1 determine the size and shape of the radio cell CS1–CS4 of each base station BTS1–BTS4. The main antenna unit ANT1 may comprise separate antennas for transmission and reception.

In the transmitter section of the base station the radio transmitter 21 is connected directly to a combiner 24. The other radio transmitter 22 is connected to a controllable change-over switch 23 which connects the radio transmitter 22 to the combiner 24 in its one switching position and to an additional antenna unit ANT2 in its other switching position. The combiner 24 combines the radio-frequency transmitting signals of the radio transmitters 21 and 22 and applies the combined signal to the main antenna unit ANT1. For the normal operation of the base station, the radio transmitter 22 is connected to the main antenna unit ANT1 through the change-over switch 23 and the combiner 24, so that all the frequency channels of the base station are within the radio coverage area of the main antenna unit ANT1, that is, available to mobile radios located in the radio cell of the base station.

In the receiver section of the base station, the main antenna unit ANT1 and the additional antenna unit ANT2 are connected through a combiner 31 to a distribution amplifier unit 32 which distributes the sum signal of the antenna units to all radio receivers 33 and 34. In the preferred embodiment of the invention, all of the radio receivers are thus connected permanently to both antenna units ANT1 and ANT2.

As mentioned above, each base station BTS uses only the main antenna unit ANT1 and communicates only with mobile radios located within its radio coverage area during normal operation. However, the traffic in the radio cell CS1, for instance, may increase temporarily so that it is greater than what the base station BTS4 of the cell can handle, while some or all of the neighbouring cells CS1–CS2 have excess traffic capacity. In such a case at least one of the base stations BTS1–BTS3 of the neighbouring cells CS1–CS3 directs part of its assigned frequency channels to another radio coverage area 1, 2 or 3 deviating from the radio coverage area CS1, CS2 or CS3 of the main antenna unit ANT1 and at least partly covering the normal radio coverage area CS4 of the overloaded base station BTS4. As a consequence, the mobile radios MS in the radio cell CS4 may temporarily establish a connection through the neighbouring base station of at least one neighbouring cell. In this way the mobile radio network is able to effectively adjust its capacity and direct excess capacity to overloaded radio cells.

The above-mentioned alternative radio coverage area 1, 2 or 3 is accomplished by means of the additional antenna unit ANT2 positioned in the base station BTS. When part of the frequency channels of the base station are to be directed temporarily to the area of the neighbouring base station, the change-over switch 23 disconnects the radio transmitter 22 from the main antenna unit ANT1 and connects it to the additional antenna unit ANT2.

In an alternative embodiment of the invention, all the transmitters of the base station can be connected to the additional antenna unit ANT2. This is necessary especially in base stations each having only a single transmitter.

In the preferred embodiment of the invention, the change-over switch 23 is controlled by a control signal SC obtained from the mobile services switching center MSC. For the control of the change-over switch, the mobile services switching center MSC may comprise means for measuring and/or predicting the traffic load of a certain neighbouring base station and for causing the change-over switch 23 to connect the radio transmitter 22 to the additional antenna unit ANT2, when the measured or predicted traffic load of the neighbouring base station exceeds a predetermined level.

In another embodiment of the invention, suitable for use e.g. in TDMA systems, at least one radio transmitter may be temporarily connectable or permanently connected simultaneously to both the main antenna unit ANT1 and the ,additional antenna unit ANT2. The power of the transmitter is thereby divided between the two antenna units and the frequency channel of the transmitter can be used simultaneously by the radio cell of the base station and an adjacent cell. The relative size of the coverage areas of the antenna units can be varied by adjusting the ratio of the transmitting power supplied from the respective transmitter to the antenna units. The main antenna unit ANT1 and the additional antenna unit ANT2 may also be phased with respect to each other in a predetermined manner so that they form a phase-controlled antenna in which the shape of the joined radio coverage area of the antenna units can be varied between a first coverage area corresponding to the radio cell and a second coverage area deviating substantially from it and covering at least partly the adjacent radio cell by adjusting the phase difference between the signals applied to the antenna units. The antenna units ANT1 and ANT2 may therefore be different radiating elements of the same antenna. In these embodiments, the local capacity of the radio network can be controlled by adjusting the power and/or phase difference continuously or in a stepwise manner. These embodiments can be realized easily in the base station shown in FIG. 2 by providing the change-over switch 23 with or by replacing it with suitable signal distribution, power control and/or phase adjustment means. The phase and/or power control can also be controlled by the signal SC from the mobile services switching center.

The figures and the description related to them are only intended to illustrate the present invention. In their details, the method, base stations and radio network according to the invention may vary within the scope of the attached claims.

I claim:

1. A base station for a digital cellular radio network, said base station having at least one frequency channel assigned thereto, and comprising:

at least one radio transmitter and radio receiver, a first antenna means having a first predetermined radio coverage area defining a radio cell, said first antenna means being effectively connected to said radio transmitter and receiver;

a second antenna means having a second radio predetermined coverage area deviating substantially from said first predetermined radio coverage area and defining a joint radio coverage area therewith, said second antenna means being effectively connected to said radio receiver;

switching means for selectively effectively connecting said radio transmitter to said second antenna means, in addition to said first antenna means, said switching means comprising at least one of:

phase shifting means for adjusting a mutual phase difference between signals of said first and second antenna means, so that coverage of said joint radio coverage area of the first and second antenna means by said radio transmitter for radio transmission is variable, in order to control the local traffic capacity of said cellular radio network, between said first predetermined radio coverage area and said joint radio coverage area, and power control means for adjusting a ratio of transmitting powers of the signals applied to said first and second antenna means, so that coverage of said joint radio coverage area of the first and second antenna means by said radio transmitter for radio transmission is variable, in order to control local traffic capacity of said cellular radio network, between said first predetermined radio coverage and said joint radio coverage area.

2. The base station of claim 1, wherein:

said first antenna means and said second antenna means are provided as different radiating elements of a single antenna.

3. The base station of claim 1, wherein:

said at least one radio transmitter and receiver comprises a plurality of radio transmitters, all effectively connected to both said first antenna means and said second antenna means.

4. The base station of claim 1, wherein:

each said switching means is a remotely controllable switching means; and further comprising:

a mobile services switching center comprising means for measuring or predicting traffic load in said network and for causing said switching means to change between connecting only a respective said first antenna means to a respective said transmitter and connecting both a respective said first antenna means and a respective said second antenna means to a respective said transmitter when measured or estimated radio traffic load in the respective said one of said first predetermined radio coverage areas crosses a predetermined level.

5. A cellular radio network, comprising:

a plurality of base stations, each comprising at least one radio transmitter, at least one radio receiver, and a first antenna means having a first predetermined radio coverage area defining a respective radio cell, said first antenna means being effectively connected to said at least one radio transmitter and said at least one radio receiver;

each said base station having at least one assigned frequency channel for establishing radio contact with active mobile radio stations within the respective said first predetermined radio coverage area;

said first predetermined radio coverage areas for at least two of said cells adjoining one another;

said assigned frequency channels of those of said base stations having cells with adjoining first predetermined radio coverage areas being different from one another;

at least one of said base stations further comprising a second antenna means having a second predetermined radio coverage area which partially extends into the first predetermined radio coverage area of an adjacent one of said base stations; and switching means for connecting each said radio transmitter to a respective said second antenna means, in addition to said first antenna means, in response to radio traffic load in the respective said adjacent one of said first predetermined radio coverage areas.

6. The cellular radio network of claim 5, wherein:

each said switching means is a remotely controllable switching means.

7. The cellular radio network of claim 6, further comprising:

a mobile services switching center comprising means for measuring or predicting said traffic load and for causing said switching means to change between connecting a respective said first antenna means and a respective said second antenna means to a respective said transmitter when measured or estimated radio traffic load in the respective said one of said first predetermined radio coverage areas crosses a predetermined level.

\* \* \* \* \*

UNITED STATES PATENT AND TRADEMARK OFFICE
CERTIFICATE OF CORRECTION

PATENT NO.    : 5,504,937
DATED         : April 2, 1996
INVENTOR(S)   : KANGAS, Sakari It is certified that error appears in the above-identified patent and that said Letters Patent is hereby corrected as shown below:

On the title page:

change item [30] from "September 5, 1991" to
 --March 5, 1991--.

Signed and Sealed this

Thirtieth Day of July, 1996

Attest:

BRUCE LEHMAN

*Attesting Officer*    *Commissioner of Patents and Trademarks*